United States Patent

[11] 3,549,129

| [72] | Inventors | John R. Graham<br>Newport Beach;<br>Rene M. DeLaunay, Los Angeles, Calif. |
|---|---|---|
| [21] | Appl. No. | 756,785 |
| [22] | Filed | Sept. 3, 1968 |
| [45] | Patented | Dec. 22, 1970 |
| [73] | Assignee | Global Marine Inc.<br>Los Angeles, Calif.<br>a corporation of Delaware |

[54] MOTION DAMPENING DEVICE
11 Claims, 5 Drawing Figs.

[52] U.S. Cl. ................................................ 254/172,
254/189, 254/175.7
[51] Int. Cl. ................................................ B66d 1/48
[50] Field of Search .......................................... 254/188,
189, 149, 53, 58, 175.7; 242/55.01; 187/26

[56] References Cited
UNITED STATES PATENTS

| 267,490 | 11/1882 | Butz .............................. | 254/189 |
|---|---|---|---|
| 3,304,061 | 2/1967 | Seward .......................... | 254/189 |

FOREIGN PATENTS

| 152,418 | 1962 | U.S.S.R. ........................ | 294/81 |
|---|---|---|---|

*Primary Examiner*—Harvey C. Hornsby
*Attorney*—Christie, Parker and Hale

ABSTRACT: The device has complementary sets of sheaves coupled together through pantographic linkage to effect a displacement in a reeved towline which is a multiple of the distance that the sheave sets move either towards or away from each other. The pantographic linkage and a pair of idler sheaves are journaled on a drive shaft. The towline enters the device over one of the idler sheaves and is then reeved over the sheave sets and leaves the device over the other idler sheave. The sheave sets are driven towards or away from each other through a pair of motorized ball race screws and nuts disposed on either side of the sheave sets.

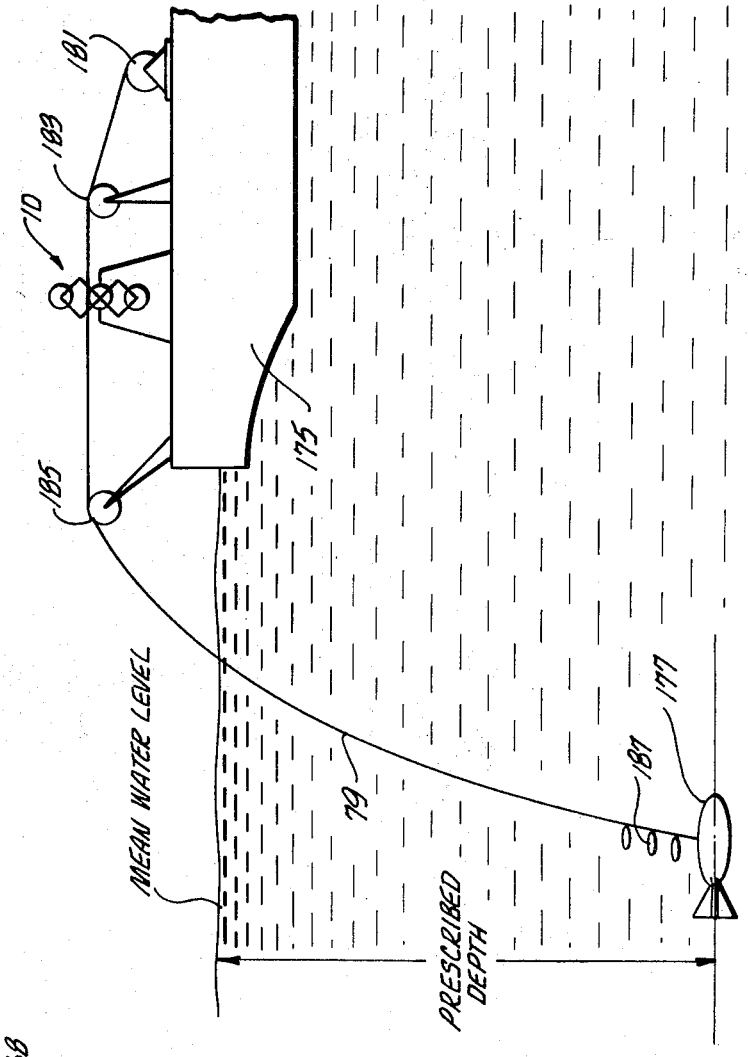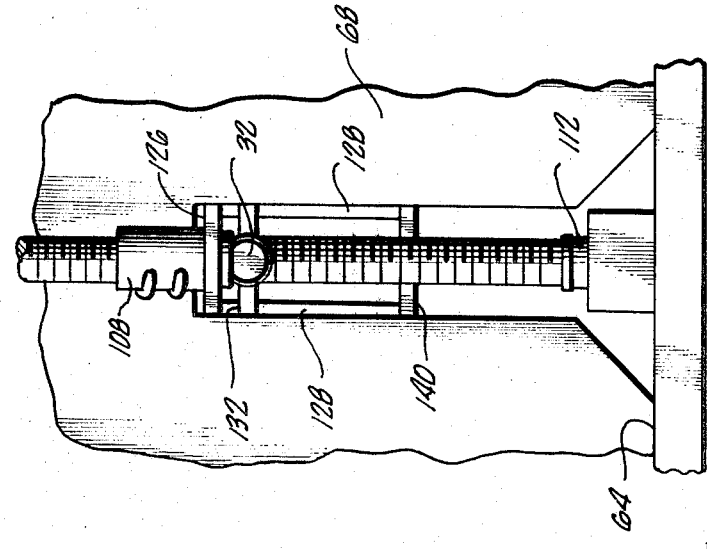

3,549,129

MOTION DAMPENING DEVICE

BACKGROUND OF THE INVENTION

The present invention in general, relates to devices for eliminating the effects of relative motion between a towing vessel and a towed object. In particular, the present invention relates to such type devices employing complementary sets of displaceable sheaves.

Subsurface exploration of the sea is becoming increasingly significant, not only for purely scientific reasons, but because the sea contains a host of commercially exploitable materials. Undersea exploration on a large scale requires mobile exploration equipment. The mobility requirement prohibits the use of static exploration mechanisms. The requirement for mobility is subsurface sensing is readily accomplished by a surface towing vessel which tows a subsurface instrument-carrying paravane or the like.

In subsurface exploration, it is often necessary to have the towed, subsurface, instrument-bearing object maintain a prescribed elevational course. Thus, it may be necessary for the sensing instruments to travel at a prescribed depth below the mean level of the sea or a prescribed depth above the ocean's floor. In any event, surface displacement of the towing ship caused by wave action must not be mirrored in the towed instrument package. Depending on the size of the towing ship and the state of the sea, wave-caused displacement above and below mean sea level can cause serious inaccuracies in the data sensed by the instrument package below. By way of example, the pitching amplitude of the towing ship may be as high as 18 feet, while the towed instrument package must maintain a prescribed elevation within 2 or 3 inches to maintain acceptable levels of sensing accuracy.

The requirement for such accurate elevational control precludes the use of motion dampening devices which rely upon the sensing of tension changes in the towline for a correction signal. By the time that tension changes are sensed in the towing vessel, the towed instrument package may have already undergone an intolerable excursion from its prescribed elevational course. Thus, departures from the prescribed elevational course of the towed object must be sensed at the object and transmitted to the towing vessel for correction.

Because the pitching period of the ship may be relatively short, the motion dampening device must be extremely responsive. Moreover, correction must be very accurate and repeatable.

The requirement for accurate depth control not only applies to subsurface instrument packages but may also be necessary in such applications as offshore drilling. It is often necessary to prevent drilling equipment from striking the ocean's floor because of wave displacement of a support ship. It is also highly desirable to maintain guideline tension within prescribed limits, a task made difficult by a pitching and heaving support ship. The response time requirement for these applications, while normally not as severe as those for instrument packages, still presents considerable problems.

SUMMARY OF THE INVENTION

The present invention is directed to an improved motion dampening device which has the facility for producing an accurate, reliable and rapid correctional response to overcome errors or hazards attendant with relative movement between two objects.

In general, the present invention contemplates a motion dampening device which includes a first and second set of sheaves coupled together to effect a displacement in a line reeved over them which is a multiple of the displacement of the sheave sets towards or away from each other. The coupling is such that the sheave sets move towards each other or away from each other in unison to pay out line or to take in line as required.

Preferably, the sheave sets are coupled together by pantographic linkage provided on either side of the sheave sets. The complementary linkage sets are journaled at their focal axis on a common drive shaft. Intermediate the rotational axis of the sheave sets a pair of idler sheaves are provided which are also journaled on the drive shaft. One of the idler sheaves positions line from a winch or the like for its reeving over the sheave sets. The complementary idler sheave serves to position the line as it leaves the sheave sets. The elevational location on the line entering and leaving the dampening device is the same because of the idler sheaves. With the same elevation, there is no resultant moment produced by the line on the device's base.

Means are provided for driving the sheave sets towards or away from each other to pay out or take in line. Preferably these means include a pair of recirculating ball race screws disposed on either side of the sheave sets. Each of the ball race screws drives a recirculating ball race nut which is coupled through a carriage to one of the sheave sets. Coupling maybe provided by attaching this sheave set's axle to the carriage. These means may be responsive to a control which is operative to sense at an object towed by the towline errors in a prescribed course of such object.

The motion dampening device of the present invention is especially well suited to maintain a prescribed elevational course of a submerged instrument package towed through the line by a towing vessel. The device is particularly valuable where the elevational error signal is generated at or near the instrument package by, for example, pressure sensors, and transmitted through the line to the dampening device's drive. In addition, it may also be used in maintaining guideline tension and drilling equipment elevation above the ocean's floor. Moreover, the device is capable of use in maintaining towline tension between a towing vessel and a towed vessel.

Motion dampening is produced by virtue of the sheave sets moving in unison towards or away from each other. A line reeved over these sheave sets and connected to an object will be paid out or taken in an amount which is a multiple of the displacement of the sheave sets. The multiple is determined by the number of sheaves in each sheave set and the number of windings of the line over these sheaves. In any event, the response of the device is very rapid because both sheave sets move in unison to effect the required line haul-in or payout. If only one set of sheave sets moved, the response time would be double that of the present device.

By journaling the idler sheaves on the drive shaft, which is midway between the sheave sets, and reeving the line over these sheaves as it enters and leaves the device, there is no moment on the base of the device. Line tension can be considerable and any moment produced by this tension can cause structural mounting difficulties on the towship. By eliminating any moment, there is no structural correction necessary in the mounting of the dampening device.

The recirculating ball race screws and nuts have the advantage that with continued use wear is minimized. With the minimization of wear, the accuracy of response of the dampening device is enhanced. Moreover, this type of screw and nut operates with very little friction; therefore the problem of frictional seizure in its drive is minimized. In addition, in this type of drive there is a minimum of play between the nut and the screw adding to the accuracy of the device's response. By coupling the drive to the sheaves on either side of the sheave sets, accuracy is further enhanced because load flexure is minimal. Moreover, the mechanical drive provided by the recirculating ball race screws and nuts is extremely rapid and accurate when compared to pneumatic or hydraulic-type drives.

The mechanical coupling of the sheave sets together through pantographic linkage also leads to rapid response time with a minimum of error introduced into the desired response. This type of linkage is also inexpensive and reliable.

These and other features, aspects and advantages of the present invention will become more apparent from the following description, appended claims and drawings.

BRIEF DESCRIPTION OF THE FIGURES

FIG. 3 is a partial view illustrating the coupling of the drive to the sheave sets of the embodiment illustrated in FIGS. 1 and 2;

FIG. 4 is a line schematic illustrating one method of controlling the operation of the device shown in the previous FIGS.; and FIG. 5 is a schematic depiction of one of the uses of the motion dampening device of the present invention.

DESCRIPTION OF THE PREFERRED EMBODIMENTS

Figure 1:
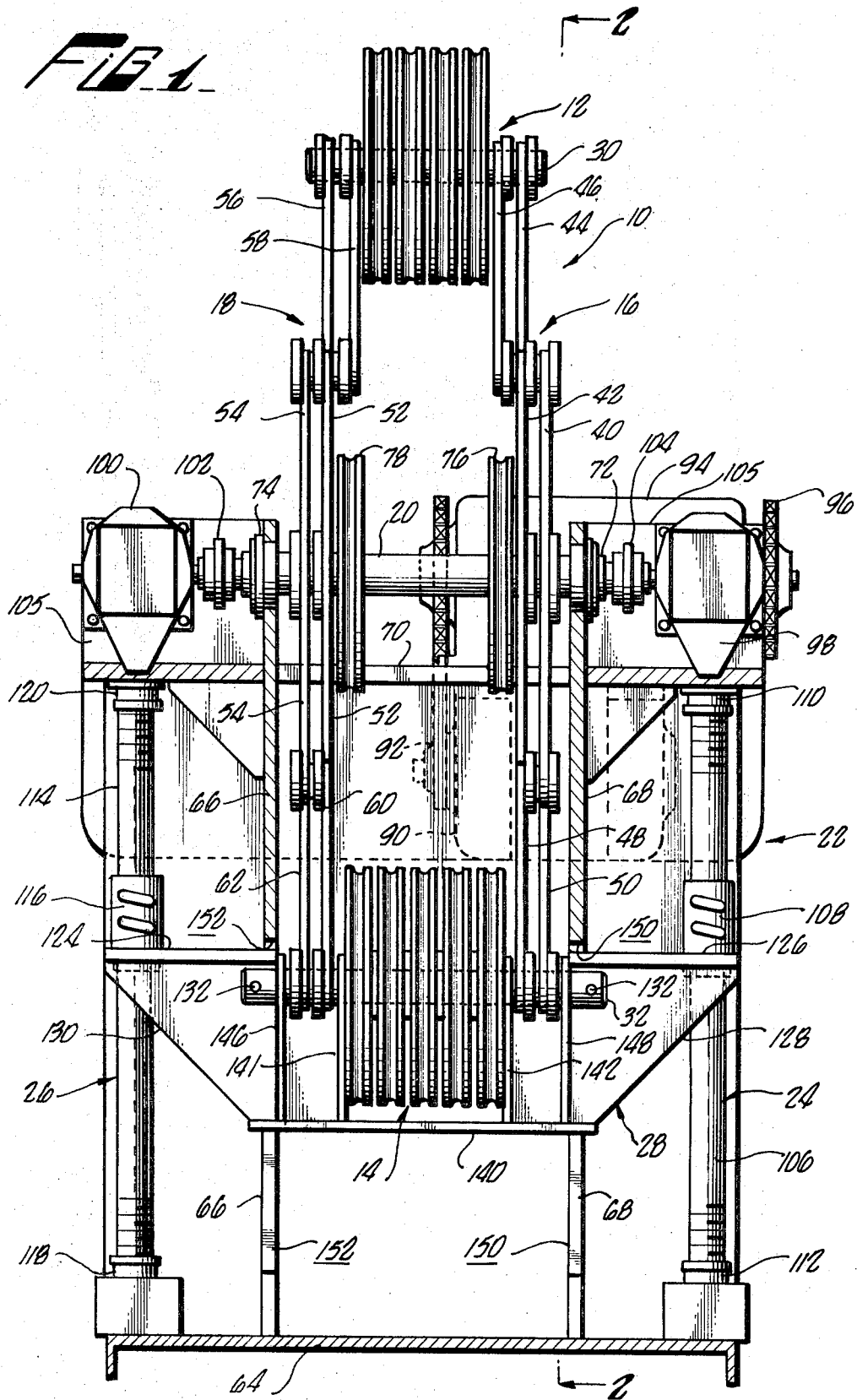
FIG. 1 is a front elevational view of the preferred embodiment of the present invention showing the supporting structure in half section along line 1-1 of FIG. 2.
Figure 2:
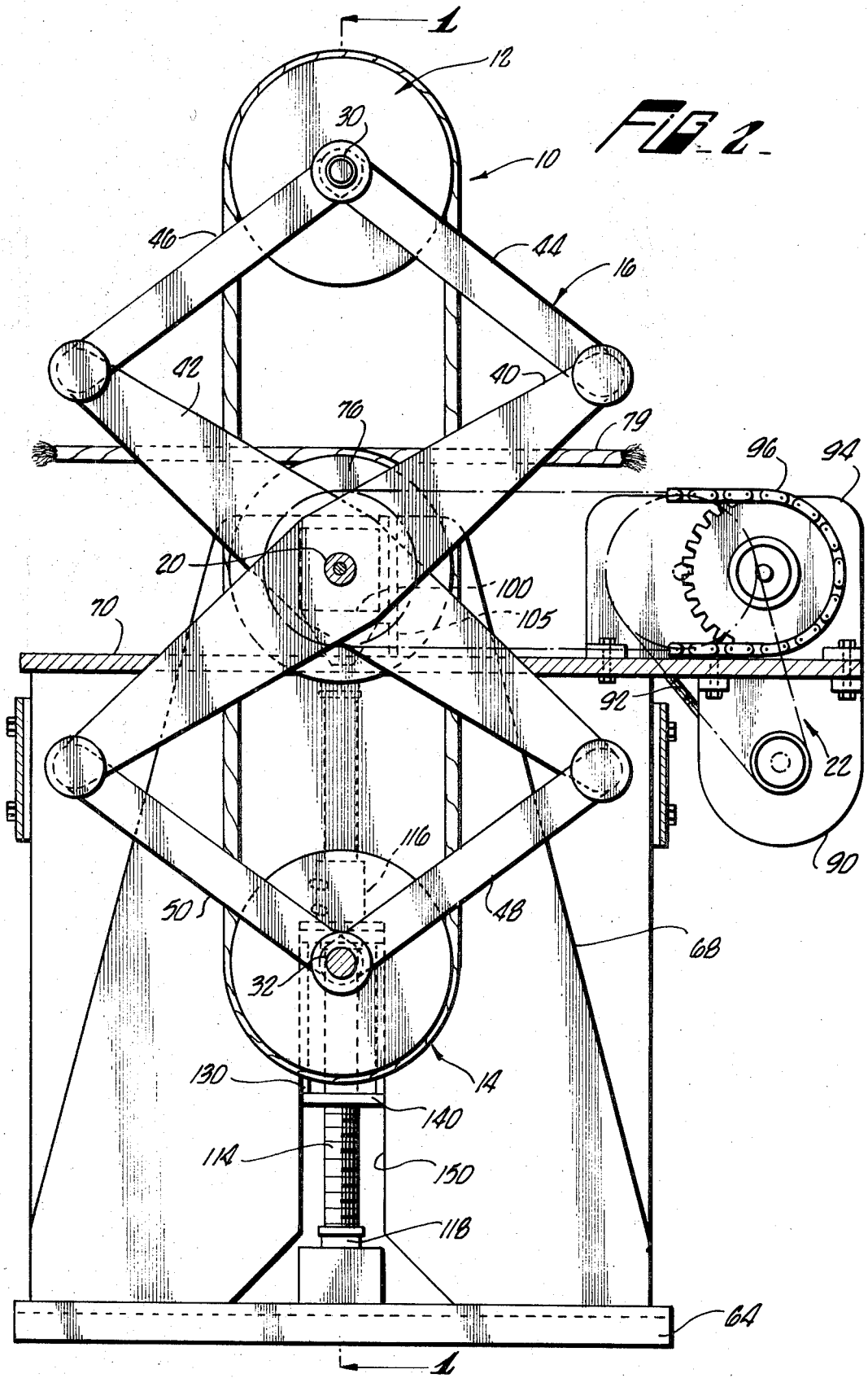
FIG. 2 is a view taken along lines 2-2 of FIG. 1.

FIGS. 1 and 2 illustrate the preferred form of the motion dampening device of the present invention which is indicated in general by reference numeral 10. The device includes an upper sheave set 12 and a lower, complementary sheave set 14. These sheave sets are coupled together by pantographic linkages 16 and 18. Both sets of linkage are carried by a drive shaft 20 at a point midway between the axial centerlines of sheave sets 12 and 14. These sheave sets are driven towards or away from each other by a drive train 22. The drive train includes a complementary pair of recirculating ball race screws and nuts 24 and 26. The recirculating screws are coupled to drive shaft 20 for their operation. The nuts of the screws carry a carriage 28 in which in turn carries lower sheave set 14.

Upper sheave set 12 includes a plurality of individual sheaves journaled for rotation on an axle 30. Lower sheave set 14 also includes a plurality of individual sheaves journaled on an axle 32. The number of individual sheaves in each of the sheave sets determines the multiple of their relative movement towards or away from each other experienced by a line reeved over them.

The pantographic linkage which couples sheave sets 12 and 14 together for cooperative movement towards or away from each other is shown to best effect in FIG. 2. FIG. 2 illustrates only pantographic linkage 16, but pantographic linkage 18 is identical. Linkage 16 includes a pair of crossed arms 40 and 42. These arms are journaled at their center for partial rotation on drive shaft 20. An upper pair of connecting arms 44 and 46 are driven by crossed arms 40 and 42. Upper arm 44 is rotatably mounted at its lower end to the upper end of the arm 40. The lower end of arm 46 is rotatably mounted to the upper end of arm 42. The upper ends of arms 44 and 46 are journaled for rotation on sheave axle 30. A lower pair of arms 48 and 50 are rotatably mounted respectively to the lower end of arm 42 and the lower end of arm. Arms 48 and 50 converge towards each other for their connection to lower sheave set 14. This coupling is provided through sheave axle 32 by a journaled connection of the axle with arms 48 and 50 at the latters'lower ends.

As seen in FIG. 1, complementary linkage 18 also includes a pair of crossed arms. These arms, denoted by reference numerals 52 and 54, are journaled for rotation on drive shaft 20. Complementing pairs of upper arms are rotatably connected to the upper end of arms 52 and 54 and rotatably connected to sheave axle 30. These arms are shown by reference numerals 56 and 58. A pair of lower arms 60 and 62 are each rotatably connected to sheave axle 32 at their lower ends and at their upper ends to the lower terminus of arms 52 and 54, respectively.

The resultant pantographic linkages 16 and 18 may be viewed as sets of cooperating parallelograms controlled by the angular relation between arms 40 and 42 and arms 52 and 54.

The sheave sets and pantographic linkages just described are supported by a framelike structure. This structure includes a base 64. Upright support plates 66 and 68 extend vertically upward from their connection to base 64. Cross support table 70 is supported above base 64 through uprights 66 and 68.

Drive shaft 20 is mounted in the upper ends of uprights 66 and 68 in a horizontal position midway between the axes of the sheaves constituting sheave sets 12 and 14. Shaft 20 is held by these uprights through bearings 72 and 74.

Idler sheaves 76 and 78 are also journaled for rotation on drive shaft 20. A towline 79 is reeved over idler sheave 78 from, for example, a winch and passes across the sheaves constituting sheave sets 12 and 14. The line leaves the device over the top of the sheave 76. For purposes of clarity, line 79 is not shown in FIG. 1.

Drive 22 includes a motor 90 which is mounted on the bottom of cross support table 70. A sprocket and chain drive 92 couples motor 90 to gear reducer 94. A second sprocket and chain drive 96 is driven by reducer 94. As seen in FIG. 1, sprocket and chain drive 96 is operatively coupled to drive shaft 20 through a gear box 98. To effect coupling between drive shaft 20 and recirculating ball race screws and nuts 24 and 26, right angle gear box 98 as well as a second right angle gear box 100 are provided. Drive shaft 20 is coupled to these gear boxes through flexible couplings 102 and 104. Gear boxes 98 and 100 are mounted on vertical plates 105 extending from their attachment to table 70 above the table.

Recirculating ball race screw and nut 24 includes a recirculating ball race screw 106 and a recirculating ball race nut 108. Nut 108 is engaged with the race of screw 106 in a well-known manner. The upper end of screw 106 is driven by gear box 98. The ball race screw is supported in position between horizontal table 70 and base 64 by thrust bearings 110 and 112.

In like manner recirculating ball race screw and nut 26 includes a recirculating ball race screw 114 which drives a recirculating nut 116. Thrust bearings 118 and 120 provide the mounting for recirculating screw 114 between table 70 and base 64. Screw 114 is operatively coupled to the output shaft of right-angle gear box 100.

The coupling of the drive with the sheave sets will now be described. Carriage 28 is carried by ball race nuts 108 and 116. The carriage includes a pair of horizontal mounting plates 124 and 126. These plates respectively engage nuts 116 and 108. Gussets or braces 128 and 130 depend from these plates. As is seen in FIG. 3, each of these gussets is formed by two plates which straddle sheave axle 32 and provide an anchor point for a pin 132 to secure sheave shaft 32 against rotation. Cross plate 140 is secured at its ends to gussets 128 and 130. Upright connecting members 142 and 144 extend from plate 140 to provide ancillary support for sheave axle 32 which passes through a hole in these members. Support is also provided by backing plates 146 and 148 which extend upwardly from plate 140 to hold sheave axle 32 which passes through them. Rectangular cutout portions 150 and 152, through uprights 68 and 66, accommodate movement of carriage 28.

The operation of the motion dampening device of the present invention will now be described. The general operation will be described with reference to FIGS. 4 and 5.

In FIG. 5 a towing ship 175 tows a paravane 177 with towline 79. The towline is connected aboard the towing ship through a winch 181. It passes over positioning sheave 183 and enters the motion dampening device 10. The line, after it has passed through the motion dampening device, leaves the ship over a frame-supported sheave 185.

A plurality of pressure sensors 187 are attached at intervals to line 79 above and proximate paravane 177. These sensors generate an error signal which is transmitted to a detector aboard the ship through a conductor in towline 79. In the detector, the error signals are amplified and converted to a depth correction signal which energizes motor 90 in either a clockwise or counterclockwise direction depending on the sense of the error detected by the sensors.

Before describing the detailed operation of the device it should be pointed out that winch 181 may be used in addition to motion dampening device 10 to maintain instrument-bearing paravane 177 on a prescribed elevational course. The winch would typically be used where large magnitude but slow displacements occur. For example, when ship 175 changes speed the catenary of line 79 will change, affecting the elevation of paravane 177. Because of the magnitude of the change it will be necessary to employ winch 181 either alone or in combination with the motion dampening device 10 to maintain the correct prescribed depth of paravane 177. Therefore the winch may be operatively coupled to the sensors to effect this requirement.

Line 79 enters motion dampening device 10 from winch 181 over idler sheave 78 and is reeved about sheave sets 14 and 12 and leaves the device over idler sheave 76. When the sensors detect a pressure change indicating that paravane 177 is departing from its prescribed course, an error signal will be sent to the detector and converted to a depth correction signal. If the sensors detect that paravane 177 is seeking a greater depth, as when the fantail of ship 175 enters a trough between waves, motor 90 will be energized to haul in line 79. When motor 90 is energized, recirculating ball race screws 106 and 114 will rotate in the correct directional sense to drive their carried nuts 108 and 116 downwardly towards base 64. The downward travel of these nuts carries with them carriage 28 which in turn lowers sheave set 14. With the lowering of sheave set 14, sheave set 12 will rise because the pantographic linkage connecting the two sheave sets elongates.

Conversely when paravane 177 begins to rise towards the surface, sensors 187 will detect that the water pressure has diminished and send a corresponding error signal. The error signal produces corrective action by motor 90 wherein it drives drive shaft 20 through sprocket and chain drive 92, gear reducer 94 and sprocket and chain drive 96 to effect rotation of screws 106 and 114 to raise nuts 108 and 116 with respect to base 64. With the raising of these nuts, in unison, carriage 28 and sheave set 14 move towards drive shaft 20. Simultaneously, sheave set 12 will lower towards the drive shaft. Line 79 will then pay out.

The error signal will be constantly generated and derive drive 22 will constantly respond to the signal. Therefore, with either corrective haul-in or payout of line 79, the error signal will determine the amount of the required line movement.

The present invention has been described with reference to a certain preferred embodiment. The spirit and scope of the appended claims should not, however, necessarily be limited to the foregoing description.

We claim:

1. A motion dampening device comprising:
   a. a base;
   b. a first set of displaceable sheaves rotatably mounted on an axle above the base;
   c. a second set of displaceable sheaves rotatably mounted on a second axle above the base in spaced relation to the first sheave set, the second sheave set complementing the first sheave set in producing in a line reeved over both sheave sets a displacement which is a multiple of the displacement of the sheave sets towards or away from each other;
   d. means coupling the displaceable sheave sets together such that the sheave sets are capable of movement in unison towards each other and away from each other;
   e. means to drive the sheave sets towards each other to payout line and to drive the sheave sets away each other to take in line;
   f. first and second idler sheaves rotatably mounted above the base at the same elevation between the first and second sheave sets; and
   g. the first idler sheave being adapted to have the line reeved over it and onto the first sheave set, the second idler sheave being adapted to have the line reeved over it from the second sheave set.

2. The motion dampening device claimed in claim 1 wherein the drive means includes a drive shaft, the idler sheaves being rotatably mounted on the drive shaft.

3. The motion dampening device claimed in claim 2 wherein the coupling means includes pantographic linkage having a focal axis at the drive shaft, the axles of the sheave sets being operatively coupled to the linkage to produce simultaneous movement of the sheave sets towards or away from each other through the linkage and in response to the drive means, the axles of the sheave sets lying in a plane which includes the focal axis of the linkage and being disposed an equal distance on either side of such focal axis.

4. The motion dampening device claimed in claim 3 wherein the drive means includes at least one recirculating ball race screw operatively coupled to the drive shaft and a recirculating ball race nut on the screw, the ball race nut being rigidly coupled to one of the sheave set's axles.

5. For use in maintaining desired elevation of an object below the sea connected by a line to a support vessel or for maintaining line tension within desired limits between a towed object and a vessel, a motion dampening device comprising:
   a. a base;
   b. a first set of displaceable sheaves rotatably mounted above the base on an axle;
   c. a second set of displaceable sheaves rotatably mounted above the base on a second axle in spaced relation to the first sheave set, the axles of the sheave sets lying in the same plane, the sheave sets complementing each other in producing in a line reeved over them a displacement which is a multiple of the amount of movement of the sheave sets towards or away from each other;
   d. a drive shaft mounted on the base midway between the sheave sets and in the same plane as the sheave set's axles;
   e. first and second idler sheaves journaled on the drive shaft such that a line may be reeved over the idler sheaves and the sheave sets with the line entering the device over one of the idler sheaves and leaving the device over the other idler sheave with the entering and leaving portions of the line at the same elevation above the base;
   f. linkage means coupling the sheave sets together such that motion of one sheave set away from the drive shaft produces a complementary motion of the other sheave set away from the drive shaft and motion of one sheave set towards the drive shaft produces a complementary motion of the other sheave set towards the drive shaft; and
   g. means to drive the sheave sets towards each other to payout line and to drive the sheave sets away from each other to take in line.

6. The motion dampening device claimed in claim 5 wherein:
   the linkage means includes two complementary pantographic linkages disposed to carry the sheave sets between them, each of the linkages including:
   i. a pair of crossed arms of equal length rotatably mounted on the drive shaft at their centers;
   ii. an upper pair of equal length arms rotatably connected at their upper ends to the axle of the first sheave set, each of the upper arms being rotatably connected to the upper end of one of the crossed arms at such upper arm's lower end; and
   iii. a lower pair of equal length arms rotatably connected at their lower ends to the axle of the second sheave set, each of the lower arms being connected to the lower end of one of the crossed arms at such lower arm's upper end.

7. The motion dampening device claimed in claim 6 including: control means operative to sense at an object towed by the line errors in a prescribed course of such object, the control means being operatively coupled with the drive means to produce a corrective response in the line upon the sensing of an excursion from the prescribed course of the towed object by movement of the sheave sets.

8. The motion dampening device claimed in claim 6 wherein the drive means includes:
   a. a pair of ball race screws disposed in the plane containing the sheave set's axles, and on either side of the sheave sets, each of the ball race screws being operatively coupled to the drive shaft;

b. a ball race nut operatively engaged with the race of each of the screws; and c. a carriage carried by the nuts, the axle of one of the sheave sets being carried by the carriage.

9. The motion dampening device claimed in claim 5 wherein the drive means includes:

a. a pair of ball race screws operatively coupled to the drive shaft on either side of the sheave sets, the axes of the ball race screws being in the plane containing the sheave set's axles;

b. a ball race nut for each of the ball race screws, each nut being operatively engaged with its associated screw; and c. a carriage engaged by the nuts, the axle of one of the sheave sets being secured to the carriage on either side of its carried sheaves.

10. The motion dampening device claimed in claim 9 wherein the linkage means includes;

a. a pair of crossed arms journaled at their centers on the drive shaft on each side of the sheave sets, the arms being of equal length;

b. a pair of upper connecting arms on each side of the sheave sets rotatably secured to the axle of the first sheave set at such arms' upper ends, each of the upper arms being rotatably secured to a corresponding one of the crossed arms at the latter's upper end such that a parallelogram is defined on each side of the sheave sets; and c. a pair of lower connecting arms on each side of the sheave sets rotatably secured to the axle of the second sheave set of such arms' lower ends, each of the lower arms being rotatably secured to a corresponding one of the crossed arms at the latter's lower end such that a parallelogram is defined on each side of the sheave sets, the lower connecting arms being equal in length to the upper connecting arms.

11. The motion dampening device claimed in claim 1 including:

control means operative to sense at an object towed by the line errors in a prescribed course of such object, the control means being operatively coupled with the drive means to produce a corrective response in the line upon the sensing of an excursion from the prescribed course of the towed object by movement of the sheave sets.